(12) United States Patent
Chin et al.

(10) Patent No.: US 10,003,963 B2
(45) Date of Patent: *Jun. 19, 2018

(54) MOBILE COMMUNICATIONS METHOD AND SYSTEM FOR SIGNALLING INFORMATION RELATING TO NETWORK'S CAPABILITIES

(71) Applicant: Samsung Electronics Co., Ltd., Gyeonggi-do (KR)

(72) Inventors: Chen-Ho Chin, Middlesex (GB); Craig Bishop, Middlesex (GB); Gert Jan Van Lieshout, Middlesex (GB)

(73) Assignee: Samsung Electronics Co., Ltd (KR)

( * ) Notice: Subject to any disclaimer, the term of this patent is extended or adjusted under 35 U.S.C. 154(b) by 139 days.

This patent is subject to a terminal disclaimer.

(21) Appl. No.: 14/268,688

(22) Filed: May 2, 2014

(65) Prior Publication Data
US 2014/0241246 A1    Aug. 28, 2014

Related U.S. Application Data

(63) Continuation of application No. 12/160,542, filed as application No. PCT/KR2007/000157 on Jan. 9, 2007, now Pat. No. 8,718,043.

(30) Foreign Application Priority Data

Jan. 10, 2006  (GB) .................................. 0600409.7
Jan. 10, 2006  (GB) .................................. 0600410.5

(Continued)

(51) Int. Cl.
*H04W 8/24*   (2009.01)
*H04W 76/04*  (2009.01)
(Continued)

(52) U.S. Cl.
CPC ........... *H04W 8/24* (2013.01); *H04L 65/1016* (2013.01); *H04L 65/1083* (2013.01);
(Continued)

(58) Field of Classification Search
CPC ................ H04W 36/0022; H04W 8/24; H04L 65/1016; H04L 65/1083
See application file for complete search history.

(56) References Cited

U.S. PATENT DOCUMENTS 6,721,565 B1   4/2004   Ejzack et al.
8,102,823 B2   1/2012   Purkayastha et al.
(Continued)

FOREIGN PATENT DOCUMENTS

CN    1325244       12/2001
RU    2005107331    8/2002
(Continued)

OTHER PUBLICATIONS

Chinese Office Action dated Sep. 25, 2015 issued in counterpart application No. 201210161942.9, 9 pages.
(Continued)

*Primary Examiner* — Omer S Mian
(74) *Attorney, Agent, or Firm* — The Farrell Law Firm, P.C.

(57) ABSTRACT

Methods and apparatuses are provided for transmitting information from a serving network element to a mobile terminal in a mobile communications network. The serving network element transmits indication indicating whether a voice over internet protocol (VoIP) via packet switched (PS) session is supported, to the mobile terminal, via an eNode B, during one of a tracking area updating (TAU) procedure and an attach procedure. A Voice Call Continuity (VCC) capability of the mobile terminal is received from the mobile terminal. It is determined whether or not to anchor a call (Continued)

based on the received VCC capability of the mobile terminal. The indication is determined based on a capability of the serving network element.

12 Claims, 2 Drawing Sheets

(30) Foreign Application Priority Data

Jan. 18, 2006 (GB) .................................. 0601007.8
Mar. 21, 2006 (GB) .................................. 0605674.1

(51) Int. Cl.
*H04W 36/00* (2009.01)
*H04W 36/14* (2009.01)
*H04L 29/06* (2006.01)
*H04W 80/10* (2009.01)
*H04W 84/04* (2009.01)

(52) U.S. Cl.
CPC ....... *H04W 36/0022* (2013.01); *H04W 36/14* (2013.01); *H04W 76/22* (2018.02); *H04W 80/10* (2013.01); *H04W 84/042* (2013.01)

(56) References Cited

U.S. PATENT DOCUMENTS

| 2002/0015391 | A1 | 2/2002 | Kriaras et al. |
| 2004/0185860 | A1 | 9/2004 | Marjelund et al. |
| 2004/0264413 | A1 | 12/2004 | Kaidar et al. |
| 2005/0047399 | A1 | 3/2005 | Lee et al. |
| 2005/0124299 | A1 | 6/2005 | Scribano et al. |
| 2005/0163089 | A1* | 7/2005 | Purkayastha ......... H04W 8/245 370/338 |
| 2006/0291419 | A1* | 12/2006 | McConnell ....... H04L 29/06027 370/331 |
| 2007/0223409 | A1 | 9/2007 | Herrero |
| 2008/0318565 | A1 | 12/2008 | Stojanovski |

FOREIGN PATENT DOCUMENTS

| RU | 2 265 282 | 11/2005 |
| WO | WO 01/31963 | 5/2001 |
| WO | WO 02/103978 | 12/2002 |
| WO | WO 2004/017564 | 2/2004 |
| WO | WO 2005/114920 | 12/2005 |
| WO | WO 2007/080444 | 7/2007 |

OTHER PUBLICATIONS

Telcordia, "MEP", 3GPP TSG SA WG2 Architecture—Ad-Hoc Meeting, S2H050124, Oct. 5, 2005.
Vodafone, "Analysis of the Architectural Solutions for VCC" S2H050214, 3GPP TSG SA WG2 Architecture—Ad-Hoc Meeting, Oct. 5, 2005.
ZTE Corporation, "A Solution to Anchor a CS Origination Call to IMS Domain", S2-051954, 3GPP TSG SA WG2 Architecture—S2#47, Aug. 27, 2005.
3GPP TR 23.806 V7.0.0; 3rd Generation Partnership Project; Technical Specification Group Services and System Aspects; Voice Call Continuity Between CS and IMS Study, (Release 7), Dec. 2005.
Saso Stojanovski, "Network warning for assisting active mode Inter-domain roaming within 3GPP radio" U.S. Appl. No. 60/725,063, Oct. 5, 2005.
UK Search Report dated Apr. 27, 2006 issued in counterpart application No. 0600410.5.

* cited by examiner

MOBILE COMMUNICATIONS METHOD AND SYSTEM FOR SIGNALLING INFORMATION RELATING TO NETWORK'S CAPABILITIES

PRIORITY

The present application is a Continuation application of U.S. patent application Ser. No. 12/160,542, filed in the U.S. Patent and Trademark Office on Jul. 10, 2008, which is a National Stage filing of PCT International Application No. PCT/KR2007/000157, filed on Jan. 9, 2007, which claims priority to U.K. Patent Applications, filed in the U.K. Intellectual Property Office on Jan. 10, 2006, Jan. 10, 2006, Jan. 18, 2006, and Mar. 21, 2006, which are assigned Serial Nos. 0600409.7, 0600410.5, 0601007.8, and 0605674.1, respectively, the entire disclosures of which are hereby incorporated by reference.

BACKGROUND OF THE INVENTION

1. Field of the Invention

The present invention relates generally to mobile communication methods and systems. More particularly, but not exclusively, the present invention relates to transmitting information relating to the network's capabilities to transmit voice information via a packet switched network portion, to voice call continuity services and/or transmitting information relating to the terminal's capability to support.

2. Description of the Related Art

Outline Description of VCC and its Associated Call Origination Procedures

A 3rd Generation Partnership Project (3GPP) Voice Call Continuity (VCC) service provides the capability to transfer the path of a voice call between a Circuit-Switched (CS) domain and an Internet Protocol (IP) Multimedia Subsystem (IMS) domain, and vice versa. The service assumes a User Equipment (UE) capable of supporting two separate call legs related to the same voice communication (one over the CS domain and one over the IMS domain). In order to facilitate the transfer of calls between the domains, all CS & IMS voice calls from and to VCC capable UEs are anchored in the subscriber's IMS domain.

FIG. 1 illustrates functional architecture for a VCC. FIG. 1 is similar to the existing 3GPP reference architecture in that a Call Continuity Control Function (CCCF) is implemented as a Session Initiation Protocol (SIP) Application Server (AS). At the time of writing, it has not been agreed whether CCCF and a Network Domain Selection function (NeDS) should be co-located. However, FIG. 1 assumes that the CCCF and the NeDS are co-located, hence only one IMS Service Control (ISC) interface is illustrated.

A UE registers with a CCCF at a time of UE IMS registration, following the procedure defined in 3GPP TS 23.288 for Application Server registration with the filter criteria set that 3rd party registration is required via IMS Service Control (ISC) interface.

A CCCF exists for each voice continuity event in the system and controls the establishment of call legs required to transfer a call between the CS and the IMS domains. If a UE is involved in multiple calls all requiring VCC, then a separate CCCF exists for each call.

VCC Registration

During and following the IMS registration procedure, VCC information is exchanged between a UE and a CCCF. This includes:

From UE=>CCCF
    UE CS status (detached, attached-idle/attached-active)
    User preferences
From CCCF=>UE
    CCCF PSI and associated CS routing number
    Operator policy The exact information exchange mechanism has not yet been specified, but the post registration exchange of information is likely to be handled by a mutual SIP Subscribe/Notify process, i.e., the UE subscribes to information from the CCCF, and the CCCF subscribes to information from the UE. Each will in turn be notified upon initial subscription and as information changes.

Call Origination from IMS Domain

At the time of call origination from the IMS domain, the SIP INVITE is routed via the Call Session Control Function (CSCF) to the CCCF using initial filter criteria. The CCCF records the call event, e.g., assigns a call reference and records route to stay in signalling path for call, and routes the call back to the Serving CSCF (S-CSCF) so that S-CSCF can perform termination handling to IMS/CS domains as defined in 3GPP TS 23.228. IMS anchoring of VCC calls originated in the IMS domain is independent of whether the UE is CS attached or detached.

If the terminal is not capable of supporting VCC procedures, but the user is a subscriber to VCC services, the lack of VCC capability in the terminal could be informed to the CCCF during IMS registration. In that case, the CCCF could decide not to IMS anchor the call. Given that S-CSCF and CCCF are both located in the user's home network, and that the IMS bearer is established end-to-end, it is debatable whether there would be much benefit in not IMS anchoring an IMS originated call from a VCC subscriber.

Call Origination from CS Domain

The default mechanism (only mandated mechanism) for IMS anchoring of VCC calls originated in the CS domain is to use Customized Applications for Mobile network Enhanced Logic (CAMEL) triggers at the Visited Mobile Switched Center (VMSC). This means it is possible to anchor calls even if the UE is not IMS registered at the time of call originating.

If the terminal is not capable of supporting VCC procedures, but the user is a subscriber to VCC services, the CCCF for the call cannot be aware of the lack of VCC capability in the terminal, as no prior exchange of VCC information will have been possible between the UE and CCCF.

FIG. 2 illustrates a message flow for CS originated VCC calls.

1. A Call Control SETUP message is sent from the UE to the VMSC.
2. Originating CAMEL Subscription Information (O-CSI) triggering in gsm Service Switching Function (SSF) at VMSC sends InitialDP message towards gsmSCF function of CCCF.
3. CCCF creates an Internet Protocol (IP) Multimedia Routing Number (IMRN) which gsmSCF returns to VMSC in CONNECT message (CCCF notes information required to complete call towards called party).

4. VMSC routes call towards MGCF in user's home IMS network using IMRN.
5. MGCF initiates SIP INVITE towards Interrogating CSCF (I-CSCF).
6. I-CSCF retrieves from a Home Subscriber Server (HSS) the CCCF associated with IMRN and forward the SIP INVITE.
7. The CCCF terminates incoming leg and initiates outgoing leg towards original called party acting as Back-to-Back User Agent (B2BUA).

SUMMARY OF THE INVENTION

Accordingly, the present invention has been designed to address at least the above problems and/or disadvantages, and to provide at least the advantages described below. An aspect of the present invention is to improve a voice call continuity service.

In accordance with an aspect of the present invention, a method is provided for transmitting information from a serving network element to a mobile terminal in a mobile communications network. The serving network element transmits indication indicating whether a voice over internet protocol (VoIP) via packet switched (PS) session is supported, to the mobile terminal, via an eNode B, during one of a tracking area updating (TAU) procedure and an attach procedure. A VCC capability of the mobile terminal is received from the mobile terminal. It is determined whether or not to anchor a call based on the received VCC capability of the mobile terminal. The indication is determined based on a capability of the serving network element.

In accordance with another aspect of the present invention, an apparatus is provided for transmitting information from a serving network element to a mobile terminal in a mobile communications network. The apparatus includes a transmitter for transmitting, by the serving network element, indication indicating whether a VoIP via PS session is supported, to the mobile terminal, via an eNode B, during one of a TAU procedure and an attach procedure. The apparatus includes a receiver for receiving a VCC capability of the mobile terminal from the mobile terminal. The apparatus further includes a controller for determining whether or not to anchor a call based on the received VCC capability of the mobile terminal. The indication is determined based on a capability of the serving network element.

In accordance with an additional aspect of the present invention, a method is provided for receiving information from a serving network element to a mobile terminal in a mobile communications network. The mobile terminal receives an indication indicating whether a VoIP via PS session is supported, via an eNode B from the serving network element, during one of a TAU procedure and an attach procedure. The mobile terminal determines a VCC capability of the mobile terminal. The mobile terminal transmits the VCC capability of the mobile terminal to the serving network element. The indication is determined based on a capability of the serving network element.

In accordance with a further aspect of the present invention, an apparatus is provided for receiving information from a serving network element to a mobile terminal in a mobile communications network. The apparatus includes a receiver for receiving, by the mobile terminal, indication indicating whether a VoIP via PS session is supported, via an eNode B from the serving network element, during one of a TAU procedure and an attach procedure. The apparatus also includes a controller for determining, by the mobile terminal, a VCC capability of the mobile terminal. The apparatus further includes a transmitter for transmitting, by the mobile terminal, the VCC capability of the mobile terminal to the serving network element. The indication is determined based on a capability of the serving network element.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
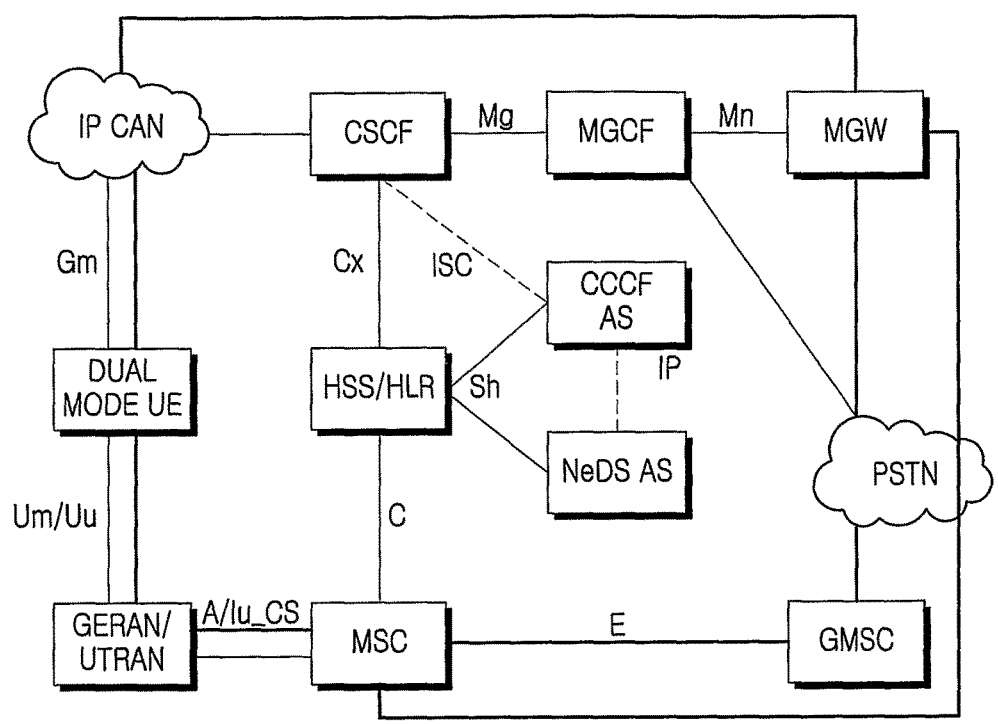
FIG. 1 is a schematic outline of a VCC functional architecture into which the present invention can be implemented.

Embodiments of the present invention will now be described in detail with reference to the annexed drawings. In the following description, a detailed description of known functions and configurations incorporated herein has been omitted for clarity and conciseness.

Above, an outline description of VCC registration and call origination is given.

When describing the procedure for CS originated VCC calls, the 3GPP technical report TR 23.806 states:

"If the UE is in a location where VCC is not possible and/or desirable, the gsmSCF directs the VMSC to continue with normal call origination procedures."

This implies that in some circumstances dependent on the location of the UE, the CCCF should not IMS anchor the call.

The advantages to not anchoring the call are that it:
reduces unnecessary signalling in the network (an IMS anchored call will always be routed to the IMS domain of the called party, even if it is to be terminated in the CS domain);
can reduce call setup latency (due to the reduction in call signalling);
allows for more optimised routing of the call (compared to case where call is IMS anchored); and
may result in improved speech quality for the calling party (due to reduction in codec switching in the user plane).

Further given that VCC is a subscription based service, it is possible that a VCC subscriber may be using a terminal that is not VCC capable (e.g., a standard 2G terminal, with a VCC subscription Universal Subscriber Identity Module (USIM)). In that case, VCC would not be possible regardless of the location of the UE, so it would be desirable not to IMS anchor any of the calls made by that terminal.

An idea proposed herein seeks to solve the problem that while it is not always desirable to IMS anchor a CS originated call from a VCC subscriber, there is at present no mechanism for enabling such anchoring to not take place. The proposal describes a mechanism whereby the desirability/possibility of using VCC within a call is communicated by the serving network to the UE via the system information broadcast or during registration signalling, and communicated by the UE to the CCCF in the home network via the SETUP and InitialDP messages sent at the time of CS call establishment.

Optional IMS Anchoring for CS Originated Calls from VCC Subscribers

When describing the procedure for CS originated VCC calls, the 3GPP technical report TR 23.806 states: "If the UE is in a location where VCC is not possible and/or desirable, the gsmSCF directs the VMSC to continue with normal call origination procedures."

This implies that in some circumstances dependent on the location of the UE, the gsmSCF in the CCCF should not anchor the call. It is not clear however:
 a) How the CCCF situated in the UE's home network, can know whether the UE is in a location where VCC is possible/desirable.
 b) How the UE can signal to the CCCF in its home network whether it is in a location where VCC is possible/desirable.
 c) How the UE can know whether it is in a location where VCC is possible/desirable.

As indicated above, the advantages to not anchoring the call are that it:
 reduces unnecessary signalling in the network (an IMS anchored call will always be routed to the IMS domain of the called party, even if it is to be terminated in the CS domain);
 can reduce call setup latency (due to the reduction in call signalling);
 allows for more optimised routing of the call (compared to case where call is IMS anchored); and
 may result in improved speech quality for the calling party (due to reduction in codec switching in the user plane).

Further given that VCC is a subscription based service, it is possible that a VCC subscriber may be using a terminal that is not VCC capable (e.g., a standard 2G terminal). In that case, VCC would not be possible regardless of the location of the UE, so it would be desirable not to IMS anchor any of the calls made by that terminal. If the UE is not IMS registered at the time of call setup, there is no way for the CCCF to know whether the terminal of the calling VCC subscriber is capable of supporting VCC procedures.

Given the above, there are at least two issues that need to be addressed when deciding whether to IMS anchor a CS originated call from a VCC subscriber.
 1. Whether it is desirable to use VCC in a call. This should be decided in the CCCF based on the VCC subscriber preferences and home network operator policy.
 2. Whether it is possible to use VCC in a call. This is not just dependent on location. It should be possible for the UE to indicate the VCC possibility decision based on the terminal VCC capability. In addition, it could be possible for the serving network to indicate whether VCC is possible e.g. based on its capability to support VoIP via its PS network.

The UE could determine VCC desirability/possibility based on four factors:
 1. Terminal VCC capability
 2. User VCC preference
 3. VoIP capability of attached PS network
 4. Availability of local IP-Connectivity Access Networks (IP-CANs) (e.g., a Wireless Local Area Network (WLAN) hotspot)

In the case of 3, the network should inform the UE of the network's VoIP capability. This could be achieved for example via System Information Broadcast, or during Routing Area Update, or General Packet Radio Service (GPRS) attached signalling. The user VCC preference (case 2) could be tied to the availability of local IP-CANs (case 4), e.g., so that calls made in areas where no suitable IP-CANs were detected should not be anchored.

Further, cases 1 and 2 could be considered as semi-static information that would not change during the lifetime of a call, where as cases 3 and 4 could be considered as dynamic information that could change as the terminal moves during the lifetime of the call.

Communicating VCC Possibility/Desirability from Serving Network to UE

To help the UE decide whether VCC is possible in its current location, the serving network could send an indication of whether it supports VoIP via its PS domain. On receiving this information, the UE could decide whether to indicate the possibility/desirability of call anchoring to the CCCF at the time of call establishment.

Below other applications for the concept of signalling the network's VoIP capability to the UE will be described.

Include Information in Non-Access Stratum (NAS) Signalling Messages

The information could be signalled during UE registration in the Routing Update Accept or in the Attach Accept message. Both messages include the information element Network Feature Support, which has two spare bits available (as described in section 10.5.5.23 of 3GPP TS 24.008). In this case the information could be tailored to individual subscribers, but its resolution would be at Location Area level.

Include Information in System Information Broadcast

The information could be broadcast in the System Information Broadcast. This would provide greater (cell level) resolution and facilitate for more dynamic management of local voice traffic between PS and CS domain, but could not be tailored for individual subscribers.

This method further extends to the Radio Network procedures that transfer system information through dedicated signalling, for instance, the UTRAN Mobility Information transfer procedures of the UMTS Radio Access Network.

Send Information to UE Via Unstructured Supplementary Service Data (USSD)

It would also be possible to send serving network VoIP capability information to the UE via USSD.

Send Information to UE Via Short Messaging Service (SMS)

It would also be possible to send serving network VoIP capability information to the UE via an SMS.

Communicating VCC Possibility/Desirability from UE to CCCF

In order that the CCCF/gsmSCF can make a decision on whether to anchor the CS originated call from the VCC subscriber, the UE should send an indication of whether it is desirable/possible to support VCC during the call.

Include Information in Classmark 2.

One way to send an indication of whether it is desirable/possible to support VCC during the call would be to include the possibility/desirability information in NAS signalling message between the UE and the network, e.g., Location update request and CM (Configuration Module) Service Request. Classmark 2, as defined in 3GPP TS 24.008 is sent in these messages, and has one spare bit available in each of octets 3, 4, and 5. The VCC capability information could also be provided to the network via classmark change procedure described in TS 44.108 section 3.4.10.

Classmark 2 is automatically included in the InitialDP message (see message 2 in FIG. 2), so on reception of the InitialDP message the gsmSCF in the CCCF could check the VCC possibility/desirability bit(s) and respond accordingly, i.e., either by sending a CONNECT message containing IMRN directing the VMSC to route the call towards the user's IMS domain for anchoring or by sending a continue message so that the call is routed normally.

The present invention provides that one or two of these spare bits be used to indicate to the network whether VCC is possible/desirable. If two of the spare bits were used it would be possible to indicate separately whether VCC was possible (e.g., based on terminal capability and/or user preference) and whether VCC was desirable (e.g., based on availability of IP-CANs in the area of the calling UE at the time of call establishment). In that case, the CCCF in the home network could decide whether to override an indication that VCC was not desirable and to anchor the call in case the user subsequently moved into the coverage area of a suitable IP-CAN.

Classmark 2 could also be extended and the UE VCC capability indicated in an extension to that classmark in order that VCC capability signalling does not use up all the remaining spare bits of the classmark.

Include Information in SETUP Message.

Figure 2:
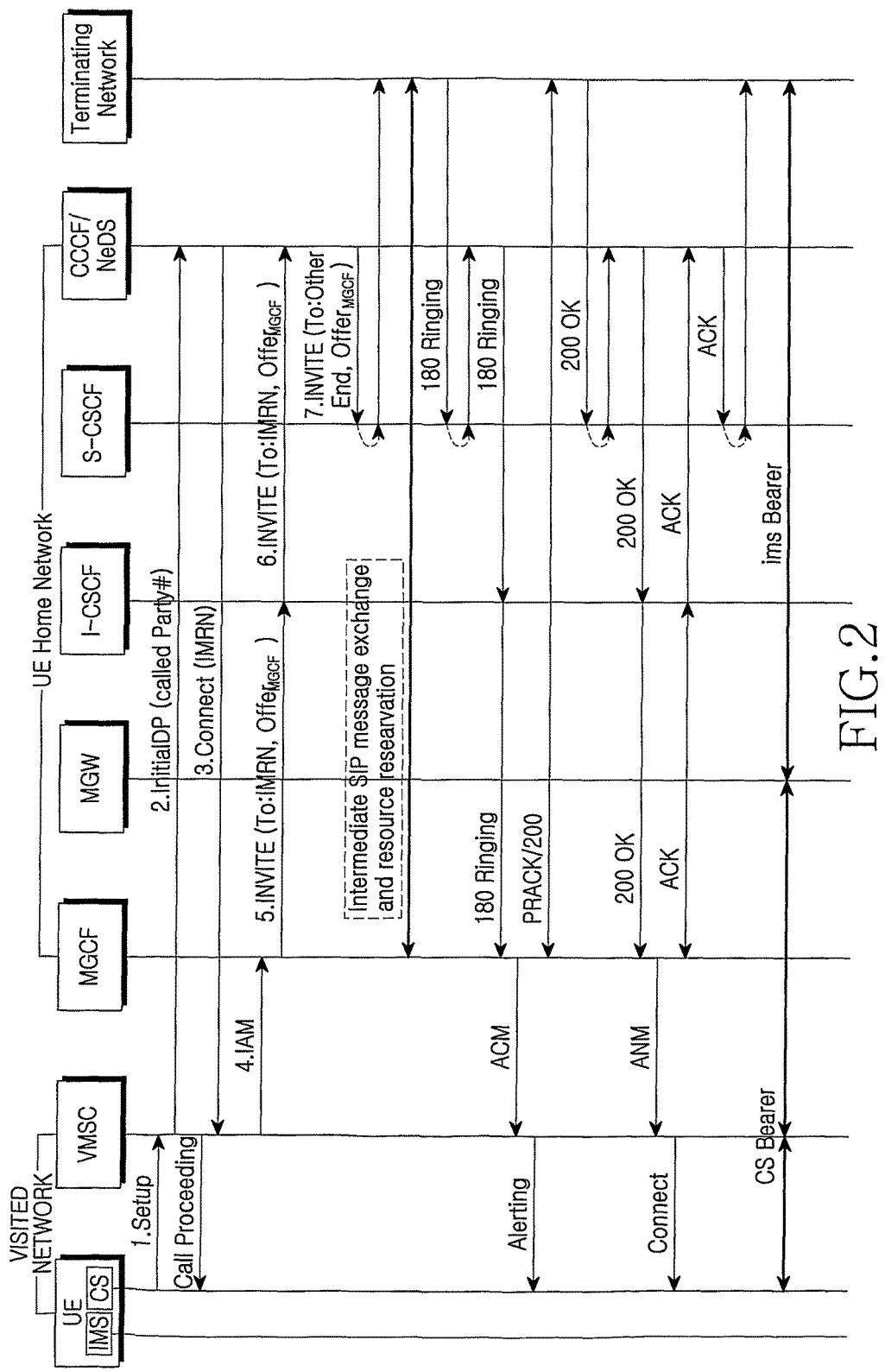
FIG. 2 is a schematic message flow diagram for CS originated VCC calls.

An alternative method to achieve sending an indication of whether it is desirable/possible to support VCC during the call would be for the UE to include VCC the possibility/desirability indication in the SETUP message sent as part of the Call Control protocol during the call establishment procedure (see message 1 of the message flow in FIG. 2). The gsmSSF in the VMSC could then include that indication in the InitialDP message sent towards the gsmSCF at the CCCF (see message 2 in FIG. 2), so that it can respond accordingly, i.e., either by sending a CONNECT message containing IMRN directing the VMSC to route the call towards the user's IMS domain for anchoring or by sending a continue message so that the call is routed normally.

The 3GPP Call Control protocol is specified in 3GPP TS 24.008. The format for the SETUP message in the case of mobile originated call establishment is shown in table 9.70a of 3GPP TS 24.008. One of the information elements contained in the SETUP message from the UE is Call Control Capabilities (described in table 10.5.89 of 3GPP TS 24.008). The purpose of this information element is to identify the Call Control Capabilities of the mobile station. The information element is four octets in length. It has one spare bit in octet 3 and four spare bits in octet 4. When CAMEL services are triggered in the VMSC, the gsmSSF includes some of the information from the SETUP message in the InitialDP message sent to the gsmSCF. It is proposed that VCC capability/possibility be added to the InitialDP below the InitialDPArgExtension defined in section 6.1.1 of 3GPP TS 29.078.

Again, proposed that one or two of the spare bits could be used as described above.

Include Information in Classmark 3.

A further alternative would be to include the UE VCC possibility/desirability information in Classmark 3. This is not presently included in the InitialDP message, but could be added in the same way as proposed above for the SETUP message.

Include Information in Classmark (2 or 3) and in SETUP Message

To facilitate the CCCF decision-making process, another alternative would be to include the semi-static information (see above) in the classmark (e.g., Classmark 2) and the dynamic information in the SETUP message sent at the time of call establishment. The CCCF could then choose whether to anchor the call based on whether the VCC possibility/desirability was static (i.e., not likely to change during the course of the call) or dynamic (i.e., more likely to change during the course of the call/dependent on the preferences/policy of the serving network).

Signal Information to CCCF via GPRS

If it is not possible to signal the information to the CCCF/gsmSCF via the circuit switch domain, the VCC possibility/desirability information could be signaled directly to the CCCF via methods and procedures supported in GPRS and could be through use of a Wireless Application Protocol (WAP). In the case of getting to the CCCF/gsmSCF directly via GPRS, the CCCF/gsmSCF address should be provisioned so that UE can direct the GPRS method to that address. This address could be in the form of a specific dedicated Access Point Name (APN).

If the CCCF did not receive an indication that VCC was possible from the UE, it could decide not to anchor the call. This would mean that non-VCC supporting UE would not have calls anchored even if they were using a VCC subscriber SIM.

Signal Information to CCCF Via SMS

If it is not possible to signal the information to the CCCF/gsmSCF as part of normal CCCF/gsmSCF as part of normal CS registration or call control signalling, the VCC possibility/desirability information could be signalled directly to the CCCF using SMS. In this case the CCCF/gsmSCF address should be provisioned so that UE can direct the SMS to that address. This could be in the form of an E164 number, for example. If the CCCF did not receive an indication that VCC was possible from the UE, it could decide not to anchor the call. This would mean that non-VCC supporting UE would not have calls anchored even if they were using a VCC subscriber SIM.

Signal Information to CCCF Via CS Data Call

If it is not possible to signal the information to the CCCF/gsmSCF via IMS or as part of normal CS registration or call control signalling, the VCC possibility/desirability information could be signalled directly to the CCCF using a CS data call. In this case the CCCF/gsmSCF address should be provisioned so that UE can direct the CS data call to that address. For example, this could be in the form of an E164 number. If the CCCF did not receive an indication that FCC was possible from the UE, it could decide not to anchor the call. This would mean that non-FCC supporting UE would not have calls anchored even in they were using a VCC subscriber SIM.

Signal Information at a Time of IMS Registration to CCCF Using VCC Feature Tag

When the IMS is available, the capability of the UE to support VCC would be indicated through use of a defined feature tag, e.g., named +g.3gpp.vcc-capble or a similarly indicative name tag. If the CCCF.gsmSCF does not receive such an indication of the UE's VCC capability, it could decide not to anchor the call. This would mean that non-VCC supporting UE would not have calls anchored, even if they were using a VCC subscriber SIM.

Optional IMS Anchoring for CS Terminated Calls Originated in the CS Domain

In the same way as for CS originated VCC calls as described above, the UE can include capability information in Classmark 2 or Classmark 3 for CS terminated calls that were originated in the CS domain. In this case, the decision to anchor the call is taken by the CCCF, after receiving the InitialDP message from the GMSC to which the incoming call was routed. This is another application for the idea of including static (see below) VCC capability information in Classmark 2 or Classmark 3.

In the following, other applications will be described for a network element transmitting information to the mobile terminal relating to the network's capabilities to transmit voice information via a packet switched network portion.

Basically, the concept of a 3GPP network being able to signal its Voice over IP (VoIP) capability with respect to its Packet Switched (PS) network is fundamental to the user terminal being able to decide whether or not a voice call should be established via Circuit Switched (CS) or IMS domains. Prior to the release 6 of the 3GPP UMTS standard, VoIP was not supported via the IMS domain due to a mixture of insufficient bandwidth being available in the access networks, and IMS not being adequately specified. From release 6 with a more fully featured IMS and the introduction of Enhanced Uplink Packet Access it should be possible to support VoIP via IMS from 3GPP IP-Connectivity Access Networks (IP-CANs). However, for reasons of traffic management, some networks might prefer sometime to not offer VoIP support in the PS networks. In that case it would be desirable to direct voice calls to take place via the CS domain. This could be achieved by signalling the network's PS VoIP capability.

The above-described application is a generic application for signalling the network's VoIP capability.

Another possible application is the CSI (Combined CS and IMS services) phase 2 work item currently being elaborated by 3GPP, as well as the IMS enhancement work items.

CSI Phase 1 is designed that the Voice Call part is always carried over the CS domain. In CSI Phase 1, there is only an end-to-end CSI call, i.e., UEs of both parties must be able to support the combining of CS and PS sessions.

In CSI Phase 2, the view is that fully fledge IMS UEs in an IMS network that can support VoIP will be making VoIP+data sessions to a CSI capable UE. So while one party may be in a VoIP scenario, the other party could be utilizing combinations of CS and PS sessions.

Progressing from that, it is highly likely that in CSI Phase 2, such IMS UEs are also CSI capable UEs.

So for the IMS and CSI capable UE to make the "intelligent" choice of whether to initiate a VoIP+Data sessions or to initiate a CSI call, the UE needs to know the VoIP capability of the network/LA/RA/cell it is currently registered and camped on.

The reverse is also true of a CSI capable UE making a call to a UE, which is both fully IMS capable and CSI capable.

a) Whether this called UE is in a VoIP capable network could mean whether the call is completely entirely by IMS call session control or if called UE is not in a VoIP network the call could then be offered as a CSI call (i.e., combined PS sessions with CS call). Thus from that perspective, the CSI capability of the UE must not only be known to the NETWORK but that the NETWORK's VoIP capability where the called UE is physically in must also be known to the NE call processes.

b) Even if the called UE is in a VoIP capable network (or VoIP part of the network), the UE could be given the choice of whether to complete the call through VoIP or through CSI. For this the UE/User should know whether the NETWORK (or that part of the NETWORK) is VoIP capable.

To further illustrate the above point, the following commercial aspect is considered. It is a driven wish by NETWORK operators to more and more "move" over to providing services through the PS domain. Towards this end, it is obvious that NETWORK operators will attempt to market VoIP as much as possible and likely at discounted rates to encourage users to utilize this service. A User knowing that he/she is in a physical position that allows VoIP could be persuaded to use VoIP instead of making a Voice Call over CS domain. Thus, the need to indicate VoIP capability of the NETWORK/LA/RA/cell that the UE is physically registered to or camped on.

While the present invention has been shown and described with reference to certain embodiments thereof, it will be understood by those skilled in the art that various changes in form and details may be made therein without departing from the spirit and scope of the present invention as defined by the appended claims and their equivalents. It is to be understood that the above-described embodiments are set out by way of example only, and that many variations or modifications are possible within the scope of the appended claims.

What is claimed is:

1. A method for transmitting information by a serving network element of a home network of a mobile terminal in a circuit switched (CS) call in a mobile communications network, comprising:
   transmitting, by the serving network element via an eNodeB of a visited network of the mobile terminal, an indication included in a first non-access stratum (NAS) message, indicating whether a voice over internet protocol (VoIP) via packet switched (PS) session is supported, to the mobile terminal, during one of a tracking area updating (TAU) procedure and an attach procedure;
   upon transmitting the indication, receiving, by the serving network element, a second NAS message including information regarding a voice call continuity (VCC) capability and desirability of the mobile terminal from the mobile terminal, the desirability being based on a preference of a user of the mobile terminal; and
   upon determining, by the serving network element, that the mobile terminal is VCC capable and VCC is not desirable based on the information, overriding the desirability and anchoring the call, and upon determining that the mobile terminal is not VCC capable based on the information, continuing the call in the CS domain,
   wherein the indication is determined based on a VCC capability of the serving network element and the mobile terminal, and is used to indicate to the mobile terminal whether the mobile terminal can expect a successful VoIP session.

2. The method of claim 1, wherein the indication is transmitted using a predetermined bit.

3. The method of claim 1, wherein the indication is determined based on a local policy.

4. An apparatus for transmitting information by a serving network element of a home network of a mobile terminal in a circuit switched (CS) call in a mobile communications network, the apparatus comprising:
   a transmitter for transmitting an indication included in a first non-access stratum (NAS) message, indicating whether a voice over internet protocol (VoIP) via packet switched (PS) session is supported, to the mobile terminal, during one of a tracking area updating (TAU) procedure and an attach procedure;
   a receiver for, upon transmitting the indication, receiving a second NAS message including information regarding a voice call continuity (VCC) capability and desirability of the mobile terminal from the mobile terminal, the desirability being based on a preference of a user of the mobile terminal; and
   a controller for, upon determining that the mobile terminal is VCC capable and VCC is not desirable based on the information, overriding the desirability and anchoring the call, and for continuing the call in the CS domain upon determining that the mobile terminal is not VCC capable based on the information, wherein the indication is determined based on a VCC capability of the serving network element and the mobile terminal, and is used to indicate to the mobile terminal whether the mobile terminal can expect a successful VoIP session.

5. The apparatus of claim 4, wherein the indication is transmitted using a predetermined bit.

6. The apparatus of claim 4, wherein the indication is determined based on a local policy.

7. A method for a mobile terminal from a serving network element of a home network in a circuit switched (CS) call in a mobile communications network, comprising:

receiving, by the mobile terminal via an eNodeB of a visited network of the mobile terminal, an indication included in a first non-access stratum (NAS) message, indicating whether a voice over internet protocol (VoIP) via packet switched (PS) session is supported, from a serving network element of a home network of the mobile terminal, during one of a tracking area updating (TAU) procedure and an attach procedure;

upon receiving the indication, determining, by the mobile terminal, information regarding a voice call continuity (VCC) capability and desirability of the mobile terminal from the mobile terminal, the desirability being based on a preference of a user of the mobile terminal; and transmitting, by the mobile terminal, a second NAS message including the information regarding the VCC capability and desirability of the mobile terminal to the serving network element, wherein the indication is determined based on a VCC capability of the serving network element and the mobile terminal, and is used to indicate to the mobile terminal whether the mobile terminal can expect a successful VoIP session, and wherein, upon determining, by the serving network element, that the mobile terminal is VCC capable and VCC is not desirable based on the information, the desirability is overridden and the call is anchored by the serving network element, and upon determining, by the serving network element, that the mobile terminal is not VCC capable based on the information, the call is continued in the CS domain.

8. The method of claim 7, wherein the indication is transmitted using a predetermined bit.

9. The method of claim 7, wherein the indication is determined based on a local policy.

10. An apparatus for a mobile terminal from a serving network element of a home network in a circuit switched (CS) call in a mobile communications network, the apparatus comprising:

a receiver for receiving, via an eNodeB of a visited network of the mobile terminal, an indication, included in a non-access stratum (NAS) message, indicating whether a voice over internet protocol (VoIP) via packet switched (PS) session is supported, from a serving network element of a home network of the mobile terminal, during one of a tracking area updating (TAU) procedure and an attach procedure;

a controller for determining information regarding a voice call continuity (VCC) capability and desirability of the mobile terminal from the mobile terminal, the desirability being based on a preference of a user of the mobile terminal; and a transmitter for, upon receiving the indication, transmitting a second NAS message including the information regarding the VCC capability and desirability of the mobile terminal, wherein the indication is determined based on a VCC capability of the serving network element and the mobile terminal, and is used to indicate to the mobile terminal whether the mobile terminal can expect a successful VoIP session, and wherein, upon determining, by the serving network element, that the mobile terminal is VCC capable and VCC is not desirable based on the information, the desirability is overridden and the call is anchored by the serving network element, and upon determining, by the serving network element, that the mobile terminal is not VCC capable based on the information, the call is continued in the CS domain.

11. The apparatus of claim 10, wherein the indication is transmitted using a predetermined bit.

12. The apparatus of claim 10, wherein the indication is determined based on a local policy.

* * * * *